(12) United States Patent
Ashizawa et al.

(10) Patent No.: US 7,758,467 B2
(45) Date of Patent: Jul. 20, 2010

(54) HYBRID VEHICLE CONTROL APPARATUS

(75) Inventors: Hiroyuki Ashizawa, Yokohama (JP);
Jun Motosugi, Sagamihara (JP);
Kazutaka Adachi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 568 days.

(21) Appl. No.: 11/845,398

(22) Filed: Aug. 27, 2007

(65) Prior Publication Data

US 2008/0058154 A1    Mar. 6, 2008

(30) Foreign Application Priority Data

Aug. 29, 2006    (JP)    ............................. 2006-232059
Jun. 5, 2007    (JP)    ............................. 2007-149568

(51) Int. Cl.
*B60W 10/02*    (2006.01)
*B60W 10/04*    (2006.01)

(52) U.S. Cl. ........................................................ 477/5

(58) Field of Classification Search .................... 477/5, 477/6, 70, 79
See application file for complete search history.

(56) References Cited

U.S. PATENT DOCUMENTS

2005/0155803 A1    7/2005    Schiele

2005/0288147 A1*    12/2005    Endo et al. ...................... 477/5
2008/0064560 A1*    3/2008    Popp et al. ...................... 477/5

FOREIGN PATENT DOCUMENTS

JP    11-082260    3/1999
JP    2000-255285    9/2000

* cited by examiner

*Primary Examiner*—Sherry L Estremsky
*Assistant Examiner*—Edwin A. Young
(74) *Attorney, Agent, or Firm*—Global IP Counselors, LLP

(57) ABSTRACT

A hybrid vehicle control apparatus is provided with a motor/generator arranged between an engine and a transmission, a first clutch disposed between the engine and the motor/generator, a second clutch disposed in a power train spanning from the motor/generator to a drive wheel, and a controller. The controller controls the engagement of the first and second clutches to select either an electric drive mode or a hybrid drive mode. The controller executes a rotational speed control of the motor/generator while in a coasting state with torque being transmitted through a one-way clutch of the transmission such that the rotational speed control increases an input rotational speed of the one-way clutch to a value closer to an output rotational speed of the one-way clutch with a difference between the input and output rotational speeds of the one-way clutch becoming equal to a target value.

10 Claims, 11 Drawing Sheets

HYBRID VEHICLE CONTROL APPARATUS

CROSS-REFERENCE TO RELATED APPLICATIONS

This application claims priority to Japanese Patent Application Nos. 2006-232059, filed on Aug. 29, 2006 and 2007-149568, filed on Jun. 5, 2007. The entire disclosures of Japanese Patent Application Nos. 2006-232059 and 2007-149568 are hereby incorporated herein by reference.

BACKGROUND OF THE INVENTION

1. Field of the Invention

The present invention generally relates to a hybrid vehicle control apparatus for selectively controlling power from a motor/generator as well as power from an engine to selectively obtain an electric drive (EV) mode in which the vehicle is driven solely with power from the motor/generator and a hybrid drive (HEV) mode in which the vehicle is driven with power from both the engine and the motor/generator.

2. Background Information

Various hybrid drive apparatus configurations have been proposed for use in hybrid vehicles. One known example of such a configuration is disclosed in Japanese Laid-Open Patent Publication No. 11-082260. The hybrid drive apparatus disclosed in Japanese Laid-Open Patent Publication No. 11-082260 has a motor/generator that is disposed between an engine and a transmission. In this hybrid drive apparatus, the motor/generator is connected to a shaft that directs engine rotation to the transmission, with a first clutch arranged to connect and disconnect a connection between the engine and the motor/generator, and a second clutch arranged between the motor/generator and an output shaft of the transmission to connect and disconnect a connection between the motor/generator and the output shaft of the transmission. The second clutch replaces a torque converter.

In a hybrid vehicle equipped with such a hybrid drive apparatus, an electric drive (EV) mode in which the vehicle is driven solely with power from the motor/generator is obtained when the first clutch is released and the second clutch is connected. Meanwhile, a hybrid drive (HEV) mode in which the vehicle can be driven with power from both the engine and the motor/generator is obtained when both the first clutch and the second clutch are connected.

In view of the above, it will be apparent to those skilled in the art from this disclosure that there exists a need for an improved hybrid vehicle control apparatus. This invention addresses this need in the art as well as other needs, which will become apparent to those skilled in the art from this disclosure.

SUMMARY OF THE INVENTION

It has been discovered that in the automatic transmission used in the above mentioned hybrid vehicle, the automatic transmission is often provided with a gear in which power from the engine and/or the motor/generator is transmitted through a one-way clutch such that physical shock resulting from gear shifting can be eliminated with a simple shift control.

When the transmission is in such gear and the hybrid vehicle is accelerating by depressing an accelerator pedal, the power is transmitted through the one-way clutch which is engaged. Conversely, when the accelerator pedal is released and the vehicle is coasting due to inertia, the input side of the one-way clutch rotates more slowly than the output side and the one-way clutch is released such that the input side is rotating freely without being driven by the output side.

Additionally, when a hybrid vehicle is coasting, the power sources, i.e., the engine and the motor/generator, are typically stopped to improve the fuel efficiency of the vehicle. Consequently, an undesirably large response delay can occur between when the driver starts to accelerate with the one-way clutch being engaged again.

The present invention was conceived based on recognition of the fact that in the kind of hybrid vehicle described above, it is possible to control a rotational speed of the input side of the one-way clutch when the vehicle is coasting before an acceleration operation is performed by controlling the rotational speed of the motor/generator in such a fashion that power is not transmitted from the motor/generator to the wheels. One object of the present invention is to provide a hybrid vehicle control apparatus that can resolve the aforementioned problems of a long response delay and one-way clutch engagement shock by controlling the rotational speed of the motor/generator while the vehicle is coasting prior to re-acceleration.

In order to achieve the object described above, a hybrid vehicle control apparatus is provided with an engine, a transmission, a motor/generator, a first clutch, a second clutch and a controller in accordance with one aspect of the present invention. The transmission includes at least one torque transmitting path that transmits power through a one-way clutch. The motor/generator is arranged between the engine and the transmission. The first clutch has a variable torque transmission capacity and is disposed between the engine and the motor/generator. The second clutch has a variable torque transmission capacity and is disposed in a power train that spans from the motor/generator to a drive wheel via the transmission. The controller is configured to disengage the first clutch and engage the second clutch to select an electric drive mode in which the engine is stopped and the drive wheel is driven solely with power from the motor/generator. The controller is configured to engage both the first and second clutches to select a hybrid drive mode in which the drive wheel is driven with power from both the engine and the motor/generator. The controller is further configured to execute a rotational speed control of the motor/generator while in a coasting state with the transmission in the torque transmitting path that transmits power through the one-way clutch such that the rotational speed control increases a rotational speed of an input side of the one-way clutch to a value closer to a rotational speed of an output side of the one-way clutch with a difference between the rotational speeds of the input and output sides of the one-way clutch becoming equal to a target value.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
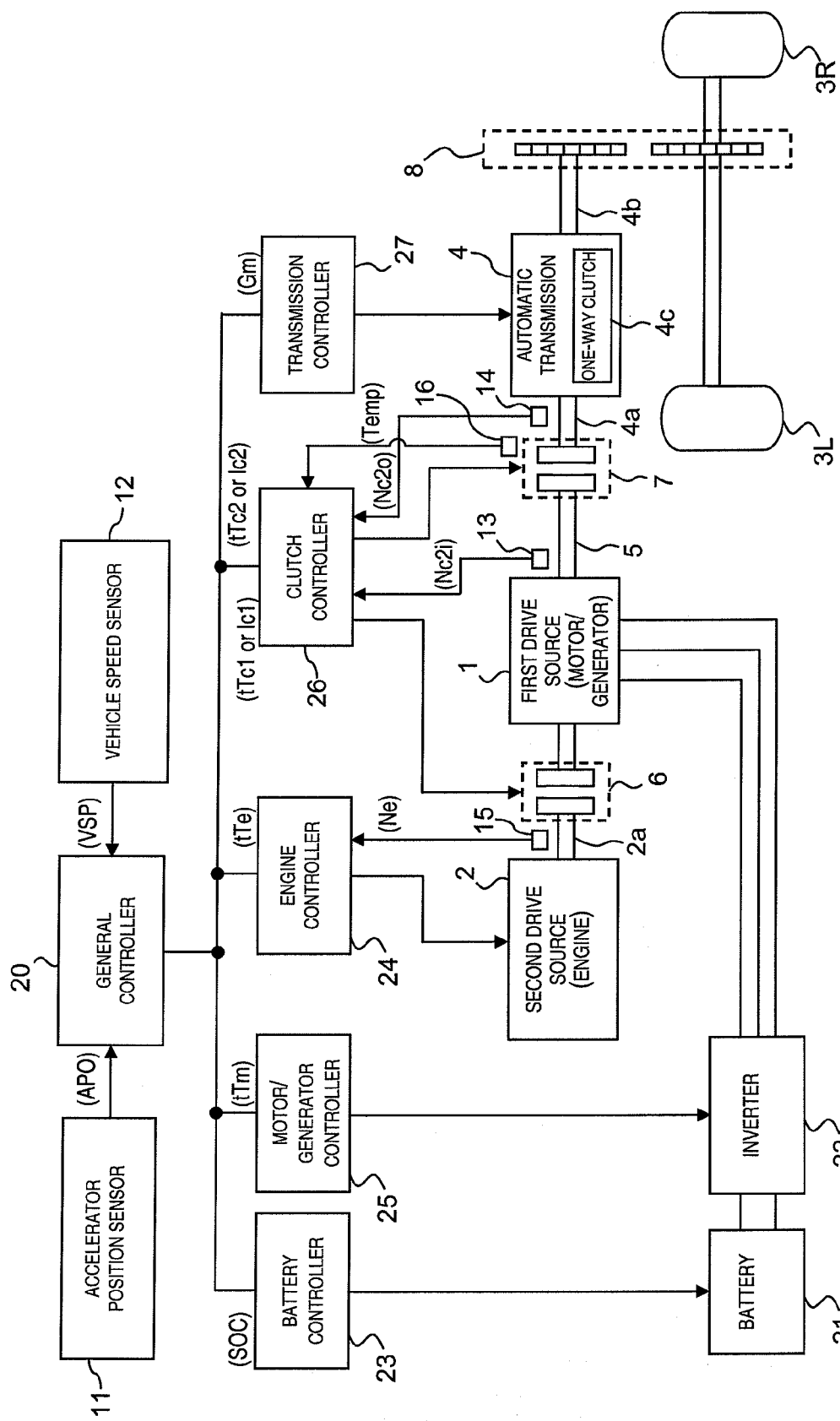
FIG. 1 overall schematic block diagram of a power train of a hybrid vehicle equipped with a hybrid vehicle control apparatus in accordance with an embodiment of the present invention.

Referring initially to FIG. 1, a wheel drive train (power train) of a hybrid vehicle having a hybrid vehicle control apparatus in accordance with an illustrated embodiment of the present invention is explained. In this example, the hybrid vehicle is arranged as a rear wheel drive hybrid vehicle. FIG. 1 is an overall schematic block diagram showing a drive train control system of the hybrid vehicle. As shown in FIG. 1, the drive train of the hybrid vehicle in the illustrated embodiment basically includes a motor/generator 1 as a first power source, an engine 2 as a second power source and left and ride drive wheels (left and right rear wheels) 3L and 3R.

Similarly to a typical rear wheel drive vehicle, the power train of the hybrid vehicle shown in FIG. 1 has an automatic transmission 4 arranged in tandem on the rearward side of the engine 2 such that rotation (torque) is transmitted from the engine 2 (crankshaft 2a) to an input shaft 4a of the automatic transmission 4 through a shaft 5. The motor/generator 1 is connected to the shaft 5.

The motor/generator 1 is an alternating current (AC) synchronous motor that is arranged between the engine 2 and the transmission 4. The motor/generator 1 acts as a motor when it drives the wheels 3L and 3R and acts as a generator when it executes regenerative braking of the wheels 3L and 3R.

A first clutch 6 is disposed between the motor/generator 1 and the engine 2, i.e., between the shaft 5 and the engine crankshaft 2a. The first clutch 6 is configured such that it can connect and disconnect the connection between the engine 2 and the motor/generator 1. The first clutch 6 is further configured such that the torque transmission capacity of the first clutch 6 can be varied in a continuous manner or a step-like manner (in stages). For example, the first clutch 6 is a multi-plate wet clutch that is configured such that its torque transmission capacity can be varied by controlling the hydraulic oil flow rate and hydraulic oil pressure of the clutch in a continuous manner with a proportional solenoid.

A second clutch 7 is disposed between the motor/generator 1 and the automatic transmission 4, i.e., between the shaft 5 and the transmission input shaft 4a. The second clutch 7 is configured such that it can connect and disconnect the connection between the motor/generator 2 and the automatic transmission 4. Similarly to the first clutch 6, the second clutch 7 is further configured such that the torque transmission capacity of the second clutch 7 can be varied in a continuous manner or a step-like manner. For example, the second clutch 7 is a multi-plate wet clutch that is configured such that its torque transmission capacity can be varied by controlling the hydraulic oil flow rate and hydraulic oil pressure of the clutch in a continuous manner with a proportional solenoid.

The automatic transmission 4 has at least one torque transmitting path (gear) in which power is transmitted through a one-way clutch 4c. In this embodiment, that gear is a first gear for forward travel. The automatic transmission 4 is configured to select the power transmission path (gear) by connecting and disconnecting the frictional holding members in a selective manner, i.e., by using specific combinations of connected and disconnected holding members. Thus, the automatic transmission 4 converts the rotation imparted to the input shaft 4a at a gear ratio corresponding to the selected gear and outputs the resulting rotation to an output shaft 4b. The output rotation is distributed to the left and right rear wheels 3L and 3R through a final reduction gear 8 that includes a differential.

The power train of the hybrid vehicle shown in FIG. 1 is configured such that when an electric drive (EV) mode is requested, such as when the vehicle is starting into motion from a stopped state or otherwise traveling with a low load and/or at a low speed, the first clutch 6 is released, the second clutch 7 is connected. Thus, the automatic transmission 4 is put in such a state that it can transmit power from the motor/generator 2 to the left and right rear wheels 3L and 3R. From this state, when the motor/generator 1 is driven, then only the output rotation of the motor/generator 1 reaches the input shaft 4a of the automatic transmission 4, after which the rotation imparted to the input shaft 4a is converted by the automatic transmission 4 at a gear ratio corresponding to the selected gear and outputted from the output shaft 4b. The rotation of the output shaft 4b is then passes through the final reduction gear 8 (which includes a differential) where torque is distributed to the left and right wheels 3L and 3R. In this way, the vehicle is driven electrically (EV drive) by the motor/generator 1 alone.

When there is a request for the hybrid drive (HEV) mode, such as when the traveling speed is high, the load is large, or the amount of electric power that can be obtained from the battery is low, both the first clutch 6 and the second clutch 7 are connected and the automatic transmission 4 is put into such a state that it can transmit power. From this state, the output rotation from both the engine 2 and the motor/generator 1 reaches the input shaft 4a of the automatic transmission 4 and the rotation imparted to the input shaft 4a is then converted by the automatic transmission 4 in accordance with the selected gear and outputted from the output shaft 4b. Then, the rotation from the output shaft 4b of the automatic transmission 4 passes through the final reduction gear 8 where the torque is distributed to the left and right rear wheels 3L and 3R. In this way, the vehicle can be driven in a hybrid fashion (HEV drive) by both the engine 2 and the motor/generator 1.

During HEV mode, the engine 2 is basically operated such that the fuel efficiency thereof is optimized. When operating the engine 2 such that its fuel efficiency is optimized causes a surplus of energy to occur, the surplus energy is used to operate the motor/generator 1 as a generator and convert the surplus energy into electric energy. By storing the generated electric energy and using it to drive the motor/generator 1 as a motor, the fuel efficiency of the engine can be improved.

Although FIG. 1 illustrates an example in which the second clutch 7 is disposed between the motor/generator 1 and the automatic transmission 4 to connect and disconnect the motor/generator 1 to and from the drive wheels 3L and 3R, it is also acceptable to arrange a second clutch between the automatic transmission 4 and the reduction gear 8, or to configure the automatic transmission 4 such that the frictional holding members used for selecting the gears can be controlled to serve as a second clutch.

FIG. 1 also shows a control system for controlling the engine 2, the motor/generator 1, the first clutch 6, the second clutch 7, and the automatic transmission 4 that make up the power train of the hybrid vehicle. As shown in FIG. 1, the control system is provided with a general controller 20 that controls the overall operating point of the power train. The operating point of the power train is defined by the combination of an target engine torque value tTe, a target motor/generator torque value tTm (or a target motor/generator rotational speed value tNm), a target torque transmission capacity value tTc1 (or clutch hydraulic solenoid current Ic1) of the first clutch 6, a target torque transmission capacity value tTc2 (or clutch hydraulic solenoid current Ic2) of the second clutch 7, and a target gear Gm of the automatic transmission 4. In order to determine the operating point of the power train, the general controller 20 receives an input signal from an accelerator position sensor 11 that detects the accelerator position APO and an input signal from a vehicle speed sensor 12 that detects the vehicle speed VSP.

The motor/generator 1 is driven with electric power from a battery 21 using an inverter 22. When the motor/generator 1 acts as a generator, the generated electricity is stored in the battery 21. When electricity is stored in the battery 21, the charging of the battery 21 is controlled by a battery controller 23 such that the battery 21 is not overcharged. Therefore, the battery controller 23 detects the state of charge (SOC) of the battery 21 (a value indicating the amount of electric power that can be withdrawn from the battery 21) and sends information related to the state of charge to the general controller 20.

Based on the accelerator pedal position APO, the battery state of charge SOC, and the vehicle speed VSP, the general controller 20 selects the operating mode (EV mode or HEV mode) that can achieve the vehicle driving force desired by the driver. Additionally, the controller 20 computes the target engine torque value tTe, the target motor/generator torque value tTm, the first target clutch torque transmission capacity value tTc1 (or clutch hydraulic solenoid current Ic1), the second clutch target torque transmission capacity value tTc2 (or clutch hydraulic solenoid current Ic2), and the target gear Gm of the automatic transmission 4. The target engine torque value tTe is sent to an engine controller 24, and the target motor/generator torque value tTm is sent to a motor/generator controller 25.

The engine controller 24 controls the engine 2 such that the engine torque Te becomes equal to the target engine torque value tTe. Simultaneously, the engine controller 24 feeds a signal from an engine speed sensor 15 to the general controller 20. The engine speed sensor 15 detects the engine rotational speed Ne (rotational speed of the input side of the first clutch 6). The motor/generator controller 25 controls the motor/generator 1 such that the torque Tm of the motor/generator 1 becomes equal to the target motor/generator torque value tTm. The motor/generator controller 25 controls the motor/generator torque Tm with electric power from the battery 21 using the inverter 22.

The general controller 20 feeds the first target clutch torque transmission capacity value tTc1 (clutch hydraulic solenoid current Ic1) and the second clutch target torque transmission capacity value tTc2 (clutch hydraulic solenoid current Ic2) to the clutch controller 26. The clutch controller 26 supplies a clutch hydraulic solenoid current Ic1 corresponding to the first target clutch torque transmission capacity value tTc1 to a hydraulic pressure control solenoid of the first clutch 6. Thus, the clutch controller 26 controls the connection degree of the first clutch 6 such that the torque transmission capacity Tc1 of the first clutch 6 is equal to the target torque transmission capacity value tTc1.

Meanwhile, the clutch controller 26 supplies a clutch hydraulic solenoid current Ic2 corresponding to the second clutch target torque transmission capacity value tTc2 to a hydraulic pressure control solenoid of the second clutch 7. Thus, the clutch controller 26 controls the connection degree of the second clutch 7 such that the torque transmission capacity Tc2 of the second clutch 7 is equal to the second clutch target torque transmission capacity value tTc2.

The general controller 20 sends the computed target gear Gm to a transmission controller 27. The transmission controller 27 controls the automatic transmission 4 such that it shifts to the target gear (target gear ratio) Gm.

In this embodiment, the general controller 20 accomplishes the hybrid vehicle control by employing the motor/generator controller 25 to control the rotational speed of the motor/generator 1 to improve the re-acceleration response and reduce the shock associated with engagement of the one-way clutch when the hybrid vehicle changes from a coasting state to an accelerating state (re-acceleration) while the transmission 4 is in a gear in which power is transmitted through the one-way clutch. In this embodiment, the apparatus includes a second clutch input rotational speed sensor 13, a second clutch output rotational speed sensor 14 and an oil temperature sensor 16. The second clutch input rotational speed sensor 13 constitutes a second clutch input rotational speed detecting section serving to detect the rotational speed of the motor/generator 1 by detecting the rotational speed Nc2i of the input side of the second clutch 7. The second clutch output rotational speed sensor 14 (constitutes a second clutch output rotational speed detecting section serving to detect the rotational speed of the input shaft 4a of the automatic transmission 4 by detecting the rotational speed Nc2o of the output side of the second clutch 7. The oil temperature sensor 16 detects the temperature Temp of the hydraulic oil of the second clutch 7. Signals from these rotational speed sensors 13 and 14 and the oil temperature sensor 16 are fed to the general controller 20 through the clutch controller 26.

Figure 2:
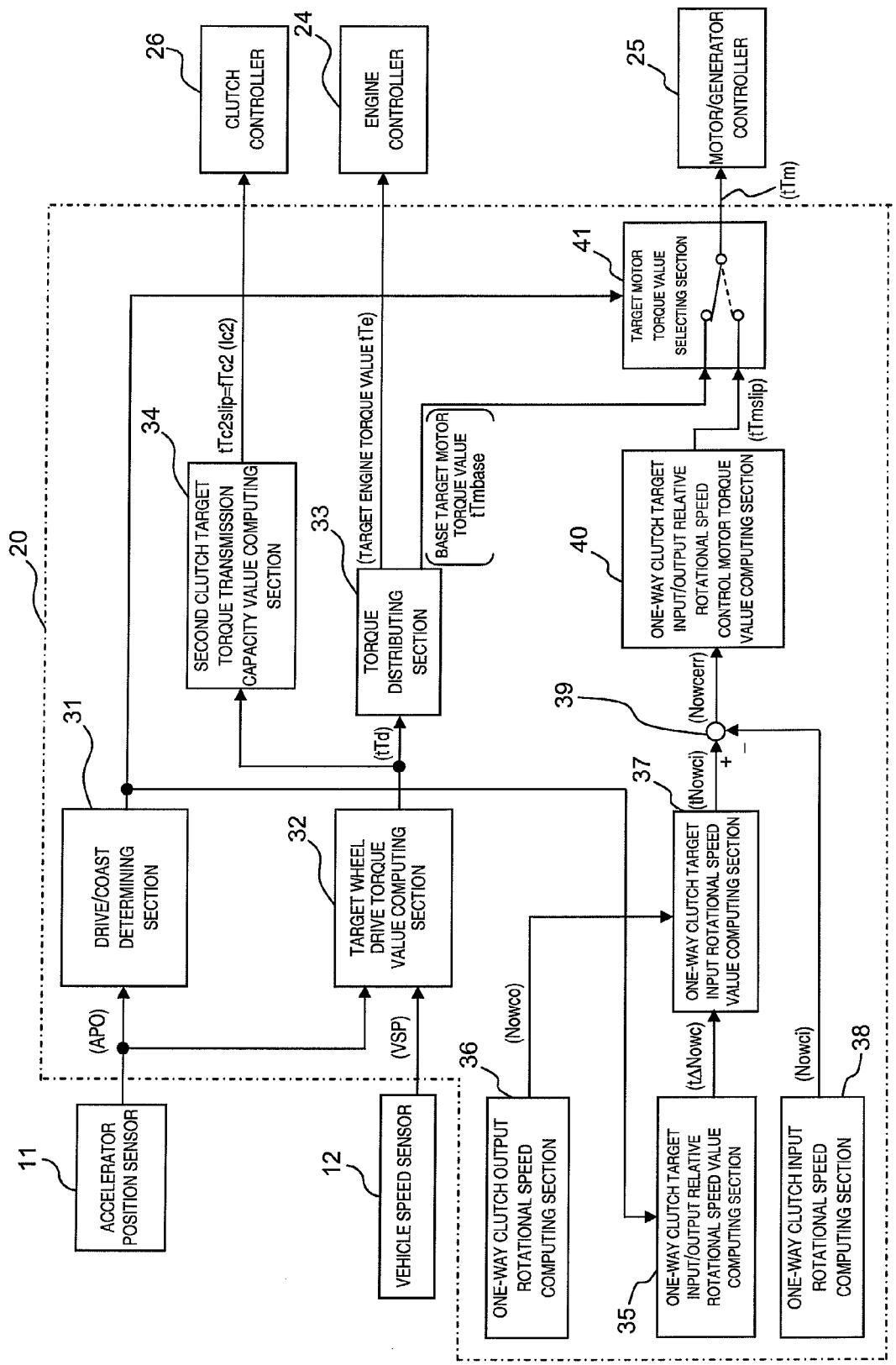
FIG. 2 is a control block diagram illustrating the computer programming executed by a general controller of the hybrid vehicle control apparatus in accordance with the illustrated embodiment of FIG. 1.
Figure 3:
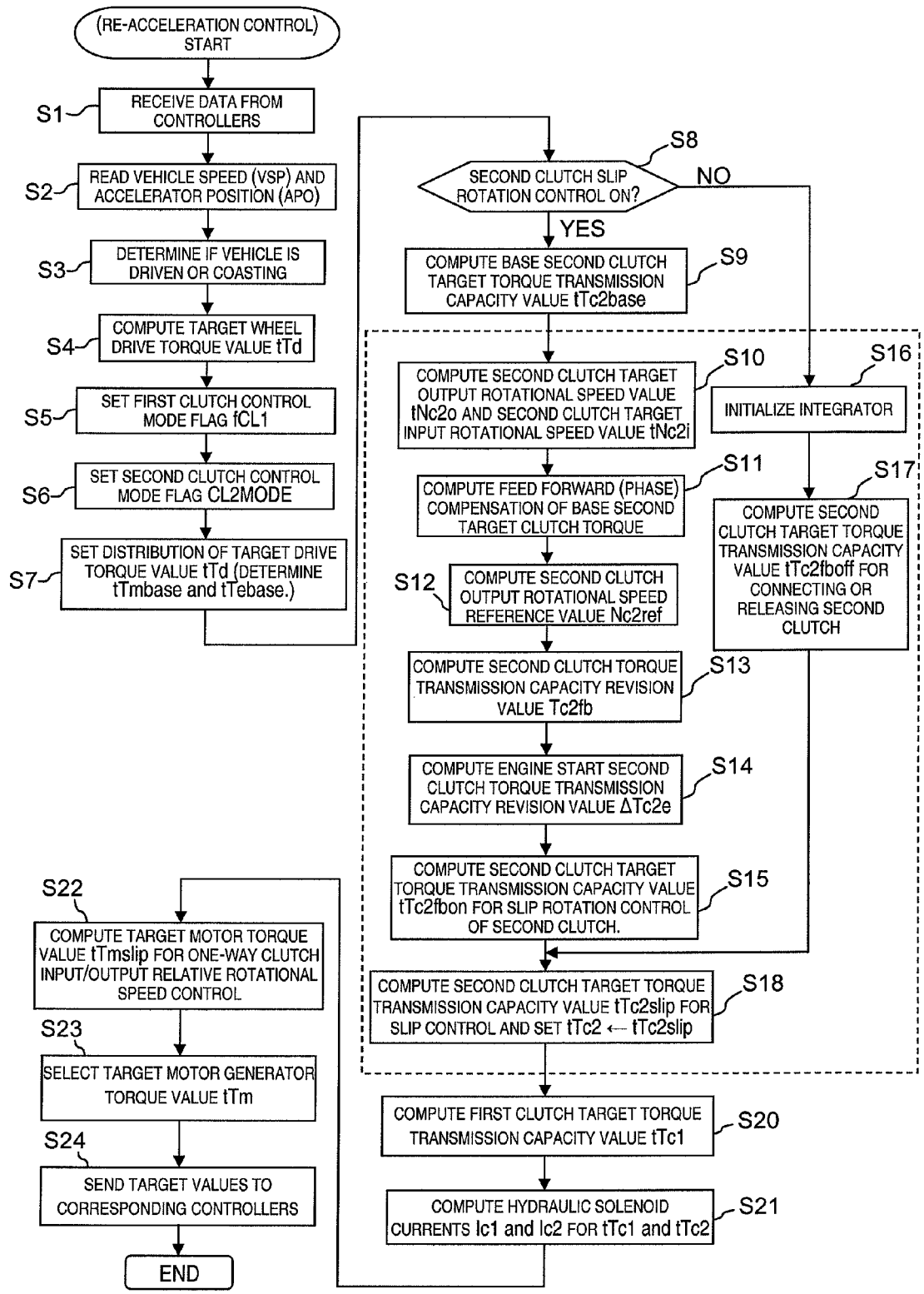
FIG. 3 is a flowchart showing a control program executed by the general controller shown in FIG. 1.

The block diagram of FIG. 2 illustrates the constituent features of the general control 20 in terms of the functions it performs, while FIG. 3 is a flowchart showing a control program executed by the general controller 20 in order to control the rotational speed of the motor/generator 1 as explained below. This control program shown in FIG. 3 is repeatedly executed with a periodic interrupt (a prescribed time period).

In step S1, the general controller 20 receives data from the other controllers 23 to 27. Thus, the general controller 20 reads the battery state of charge SOC, the engine speed Ne, the input rotational speed Nc2i of the second clutch 7 and the output rotational speed Nc2o of the second clutch 7, the hydraulic oil temperature Temp of the second clutch 7, and the selected gear (gear ratio) Gm of the automatic transmission 4.

In step S2, the general controller 20 reads the accelerator position APO and the vehicle speed VSP based on the signals from the sensors 11 and 12.

In step S3, based on the accelerator position APO, the general controller 20 determines if the hybrid vehicle is in a drive state in which the accelerator pedal is depressed (i.e., APO>0) or if the hybrid vehicle is in a coasting state in which the accelerator pedal is released (i.e., APO=0). Thus, step S3 corresponds to the drive/coast determining section 31 shown in FIG. 2.

Figure 5:
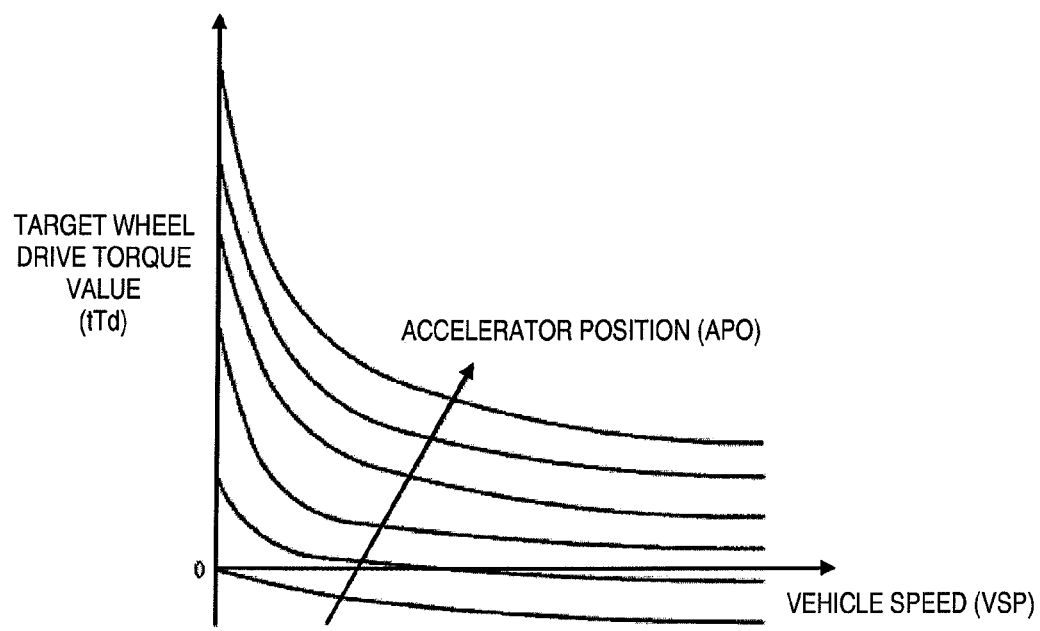
FIG. 5 is a driving force schedule map that is used to find a target wheel drive torque value.

In step S4, the general controller 20 refers to, for example, the driving force schedule map shown in FIG. 5 and determines the target wheel drive torque value tTd based on the vehicle speed VSP and the accelerator pedal APO. Thus, step S4 corresponds to the target wheel drive torque value computing section 32 shown in FIG. 2.

In step S5, the general controller 20 sets a first clutch control mode flag fCL1 based on such vehicle operating conditions as the battery state of charge SOC, the target wheel drive torque value tTd, and the vehicle speed VSP. The first clutch control mode flag fCL1 serves to command that the first clutch 6 be connected (engaged) or disconnected (released).

The setting of the first clutch control mode flag fCL1 can be accomplished in a variety of ways. In brief, when the driving conditions are such that the combustion efficiency of the engine 2 is comparatively poor, e.g., when the vehicle is traveling with a small load and a low speed such as during gradual acceleration from a stopped condition, the general controller 20 determines that the first clutch 6 should be released and sets the first clutch control mode flag fCL1 to 0 such that the vehicle is driven in EV mode using the motor/generator 1 only and not the engine 2. Meanwhile, when the battery state of charge SOC is below a set value and it is difficult to drive the vehicle in EV mode or when the vehicle is accelerating rapidly or traveling at a high speed and a sufficient driving force cannot be obtained with power from the motor/generator 1 alone, then the general controller 20 determines that it is necessary to obtain power from the engine 2, as well. Thus, the general controller 20 sets the value of the first clutch control mode flag fCL1 to 1 such that the first clutch 6 is connected and the vehicle is driven in HEV mode using both the engine 2 and the motor/generator 1.

In step S6, the general controller 20 sets a second clutch control mode flag CL2MODE based on such vehicle operating conditions as the battery state of charge SOC, the target wheel drive torque value tTd, the first clutch control mode flag fCL1, and the vehicle speed VSP. The second clutch control mode flag CL2MODE serves to command that the second clutch 2 be connected (fully engaged), disconnected (released), or connected in a slipping state (partially engaged).

Figure 4:
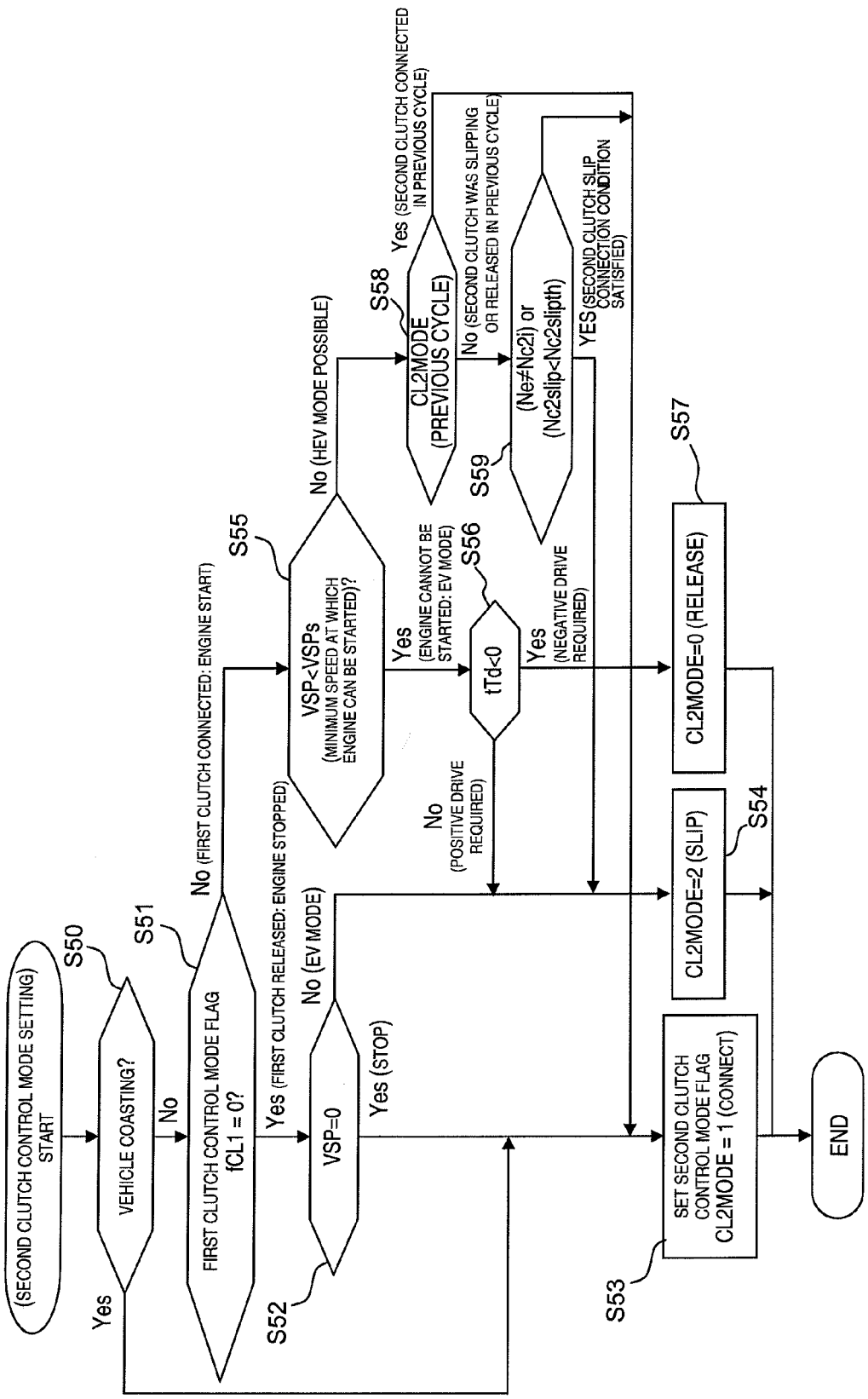
FIG. 4 is a flowchart showing a control program executed by the general controller for determining the second clutch control mode during the control program of FIG. 3.

The value of the second clutch control mode flag CL2MODE is set by executing the control program shown in FIG. 4. In step S50 of FIG. 4, the general controller 20 determines if the vehicle is coasting based on the result of step S3. If the vehicle is coasting, then the general controller 20 determines that the second clutch 7 should be connected and proceeds to step S53, where it sets the value of the second clutch control mode flag CL2 MODE to 1 (connect).

Meanwhile, if it determines in step S50 that the vehicle is not coasting, i.e., if the vehicle is being driven by a power source, then the general controller 20 proceeds to step S51, where it determines if the value of the first clutch control mode flag fCL1 is 0, i.e., if the first clutch 6 should be released. If the value of fCL1 is 0, i.e., if the vehicle should be put into EV mode by releasing the first clutch 6 and stopping the engine 2, then the general controller 20 proceeds to step S52 and determines if the vehicle speed is 0, i.e., if the vehicle is in a stopped state.

If the vehicle is in a stopped state, then the general controller 20 proceeds to step S53, where it sets the value of the second clutch control mode flag CL2 MODE to 1 (connect) to connect the second clutch 7 in preparation for the vehicle to start into motion from the stopped state.

If the vehicle speed VSP is determined not to be 0 in step S52, i.e., if the vehicle is traveling (in EV mode), then the general controller 20 proceeds to step S54 and sets the second clutch control mode flag CL2MODE=2 (slip) to connect the second clutch 7 in a slipping fashion in preparation for the engine 2 to be started.

If it determines in step S51 that the first clutch control mode flag fCL1 is not 0, i.e., that the vehicle should be put into HEV mode by connecting the first clutch 6 and starting the engine 2, the general controller 20 proceeds to step S55 and determines if the vehicle speed VSP is below a set vehicle speed VSPs that is equal to, for example, a minimum vehicle speed at which the engine 2 can be started. In other words, the general controller 20 determines if the vehicle speed is in a region in which the engine 2 cannot be started or a region in which the engine 2 can be started (i.e., in which the vehicle can be driven in HEV mode).

If the vehicle speed VSP is below the set vehicle speed VSPs (i.e., in a region where the engine 2 cannot be started, which is an EV drive region), then the general controller 20 proceeds to step S56 and determines the sign of the target drive torque value tTd. If the value tTd is larger than 0, i.e., if a positive drive torque is required, then the general controller 20 proceeds to step S54 and sets the second clutch control mode flag CL2MODE=2 (slip) to connect the second clutch 7 in a slipping fashion in preparation for the engine 2 to be started. The purpose of connecting the second clutch 7 in a slipping fashion is to prevent the torque fluctuation that occurs at the motor/generator 1 when the engine 2 is started from being transferred to the drive wheels.

If it determines in step S56 that the target drive torque value tTd is smaller than 0, i.e., that a negative drive torque is required, then the general controller 20 proceeds to step S57 and sets the second clutch control mode flag CL2MODE to 0 (release) because the engine 2 cannot be started in a favorable manner from EV mode with the second clutch 7 in a slipping state.

If it determines in step S55 that the vehicle speed VSP is equal to or larger than the set vehicle speed VSPs, i.e., that the vehicle speed is in a region in which the engine 2 can be started (i.e., in which the vehicle can be driven in HEV mode), then the general controller 20 proceeds to step S58 and determines if the previous value of the second clutch control mode flag CL2MODE (i.e., the value in the previous control cycle) was 1, i.e., if the second clutch 7 was connected in the previous control cycle.

If it determines in step S58 that the previous value of CL2MODE was 1, i.e., that the second clutch 7 was connected in the previous cycle, then the general controller 20 proceeds to step S53 and holds the second clutch control mode flag CL2MODE at 1 (connected).

If it determines in step S58 that the previous value of CL2MODE was not 1, i.e., that the second clutch 7 was disconnected or connected in a slipping state in the previous cycle, then the general controller 20 proceeds to step S59 and determines if the engine speed Ne (i.e., the rotational speed of the input side of the first clutch 6) is different from the rotational speed Nc2i of the input side of the second clutch 7 (i.e., the rotational speed of the output side of the first clutch 6) or if the actual slip rotational speed Nc2slip of the second clutch 7 is smaller than a prescribed set value Nc2slipth. In this way, the general controller 20 determines if a condition exists requiring a slip connection of the second clutch 7.

If it determines in step S59 that the second clutch slip connection condition exists, i.e., that the second clutch 7 needs to be connected in a slipping fashion, then the general controller 20 proceeds to step S54 and sets the value of the second clutch control mode flag CL2MODE to 2 (slip).

If it determines in step S59 that the second clutch slip connection condition does not exist, i.e., that the second clutch 7 should not be connected in a slipping fashion, then the general controller 20 proceeds to step S53 and sets the value of the second clutch control mode flag CL2MODE to 1 (connect).

After completing step S6 of FIG. 3, i.e., after setting the second clutch control mode flag CL2MODE by executing the control program shown in FIG. 4, the general controller 20 proceeds to step S7 of FIG. 3. Step S7 corresponds to the torque distributing section 33 shown in FIG. 2. In step S7, the general controller 20 calculates a base target motor torque value tTmbase and a base target engine torque value tTebase for determining how to distribute the target wheel drive torque value tTd between the motor/generator 1 and the engine 2. The base target engine torque value tTebase is sent without modification to the engine controller 24 as the target engine torque value tTe in step S24.

There are no particular limitations on the method of distributing the target wheel drive torque value tTd; a detailed explanation thereof is omitted here because it is not relevant to the present invention.

In step S8, the general controller 20 determines if it should execute the slip rotation (connection) control of the second clutch 7. More specifically, the general controller 20 determines that slip rotation (connection) control of the second clutch 7 should be executed (i.e., should be turned ON) if the value of the second clutch control mode flag CL2MODE set in step S6 is 2 (i.e., if the second clutch 7 needs to be connected in a slipping fashion) and the amount of slippage between the input rotational speed Nc2i and the output rotational speed Nc2o of the second clutch 7 is equal to or above a prescribed value. Otherwise, the general controller 20 determines that slip rotation (connection) control of the second clutch 7 should not be executed (i.e., should be turned OFF).

If it determines in step S8 that slip rotation (connection) control of the second clutch 7 should be executed, then the general controller 20 proceeds to step S9 and calculates a base target torque transmission capacity value tTc2base of the second clutch 7 corresponding to the vehicle driving operation(s) being executed by the driver and the traveling state of the vehicle.

Although it is acceptable to use the target wheel drive torque value tTd calculated in step S4 based on the accelerator position APO and the vehicle speed VSP as the second clutch base target torque transmission capacity value tTc2base, the second clutch base target torque transmission capacity value tTc2base can also be calculated as will now be described.

Figure 6:
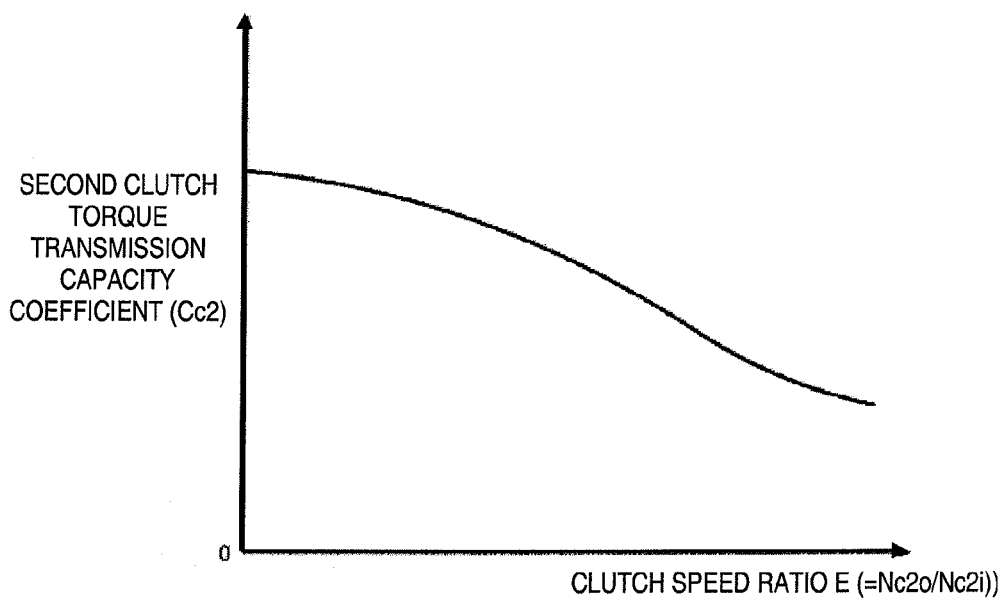
FIG. 6 is a torque transmission capacity schedule map that is used to find a torque transmission capacity of the second clutch shown in FIG. 1.

A torque transmission capacity coefficient Cc2 is found based on the ratio E of the output rotational speed Nc2o of the second clutch 7 to the input rotational speed Nc2i of the second clutch 7 (E=Nc2o/Nc2i) using a torque converter characteristic like that exemplified in FIG. 6. The second clutch base target torque transmission capacity value tTc2base is then calculated based on the torque transmission capacity coefficient Cc2 and the input side rotational speed Nc2i of the second clutch 7 using the equation (1) below.

$$tTc2base = Cc2 \times Nc2i2 \qquad (1)$$

Figure 7:
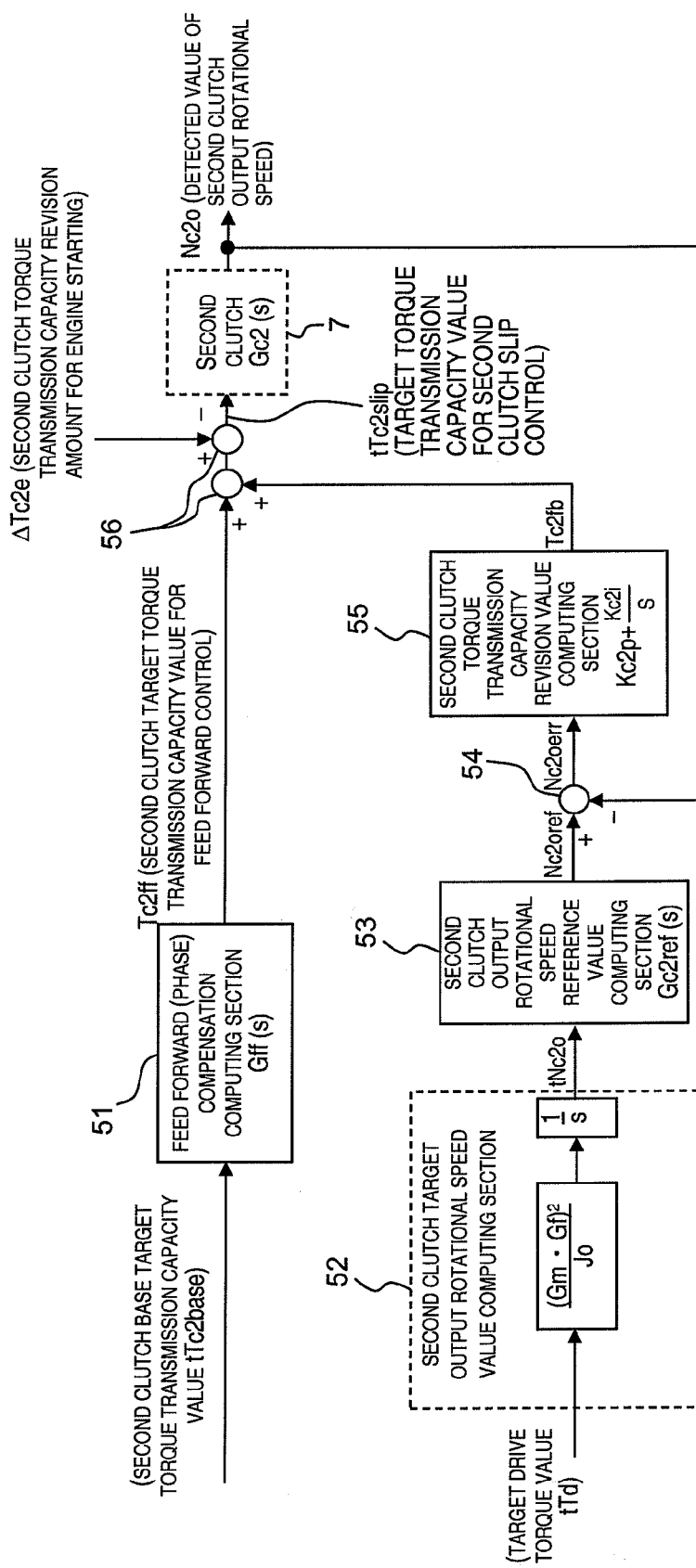
FIG. 7 is control block diagram illustrating the computer programming of the second clutch connection control portion of the control program shown in FIG. 3.

The steps S10 to S18 enclosed inside a broken line in FIG. 3 constitute a block for calculating a target torque transmission capacity value tTc2slip for slip control of the second clutch 7 and correspond to the second clutch slip control target torque transmission capacity value computing section 34 shown in FIG. 2. This block of steps appears as shown in FIG. 7 when expressed as a block diagram.

In step S10 of FIG. 3, the general controller 20 calculates an target output rotational speed value tNc2o of the second clutch 7 based on the target drive torque value tTd calculated in step S4 and calculates a second clutch target input rotational speed value tNc2i required to achieve a second clutch target slip rotational speed value based on the second clutch target slip rotational speed value and the detected value of the second clutch output rotational speed Nc2o (value detected by the sensor 14).

Method of calculating the second clutch target output rotational speed value tNc2o in step S110 will now be explained. As shown with the second clutch target output rotational speed value computing section 52 in FIG. 7, the target output rotational speed value tNc2o of the second clutch 7 is calculated using the equation (2) below based on the target drive torque value tTd, a moment of inertia Jo of the vehicle, the gear ratio Gm determined by the selected gear of the automatic transmission 4 of the wheel drive train, and the final reduction ratio Gf of the final reduction gear 8 of the wheel drive train.

$$tNc2o = \{(Gm \times Gf)2/Jo\} \times (1/s) \times tTd \qquad (2)$$

After calculating the second clutch target output rotational speed value tNc2o and the second clutch target input rotational speed value tNc2i in step S110 of FIG. 3, as described above, the general controller 20 proceeds to step S11, which corresponds to the feed forward (phase) compensation computing section 51 shown in FIG. 7. In step S11, a feed forward (phase) compensator Gff(s) applies a phase compensation to the second clutch base target torque transmission capacity value tTc2base calculated in step S9 to obtain a second clutch target torque transmission capacity value Tc2ff for feed forward control.

The second clutch target torque transmission capacity value tTc2ff for feed forward control is actually calculated using the recurrence formula (3) shown below, which is obtained by discretizing using a Tustin approximation or the like.

$$\begin{aligned} Tc2ff &= GFF(s) \times tTc2base \qquad (3) \\ &= \{Gc2ref(s)/Gc2(s)\} \times tTc2base \\ &= \{(\tau c2 \times s + 1)/(\tau c2ref \times s + 1)\} \times tTc2base \end{aligned}$$

where
- Gc2*ref*(s): reference model of second clutchd
- Gc2(s): actual model of second clutch;
- τc2: model time constant for second clutch; and
- τc2*ref*: reference response time constant for control of second clutch.

Step S12 corresponds to the second clutch output rotational speed reference value computing section 53 shown in FIG. 7. In step S12, the general controller 20 passes the second clutch target output rotational speed value tNc2*o* through the reference model Gc2*ref*(s) of the second clutch 7 to calculate a second clutch output rotational speed reference value Nc2oref for matching to the reference model.

The second clutch output rotational speed reference value Nc2oref is actually calculated using the recurrence formula (4) shown below, which is obtained by discretizing using a Tustin approximation or the like.

$$Nc2oref = Gc2ref(s) \times tNc2o \qquad (4)$$
$$= \{1/(\tau c2ref \times s + 1)\} \times tNc2o$$

where
- τc2*ref*: reference response time constant for control of second clutch

The second clutch output rotational speed error computing section 54 calculates the second clutch output rotational speed error Nc2oerr between the second clutch output rotational speed reference value Nc2oref and the detected value of the second clutch output rotational speed Nc2*o* (Nc2oerr=Nc2oref−Nc2*o*).

Step S13 of FIG. 3 corresponds to the second clutch torque transmission capacity revision value computing section 55 shown in FIG. 7 and serves to calculate a second clutch torque transmission capacity revision value Tc2*fb* for adjusting the second clutch output rotational speed error Nc2oerr to 0, i.e., for making the detected second clutch output rotational speed Nc2*o* match the second clutch output rotational speed reference value Nc2*oref*. The second clutch torque transmission capacity revision value Tc2*fb* is a feedback control amount.

The second clutch torque transmission capacity revision value Tc2*fb* is actually calculated using the recurrence formula (5) shown below, which is obtained by discretizing using a Tustin approximation or the like.

$$Tc2fb = \{Kc2p + (Kc2i/s)\} \times Nc2oerr \qquad (5)$$

where
- Kc2*p*: proportional control gain
- Kc2*i*: integral control gain

In step S14, the general controller 20 calculates a torque transmission capacity revision (decrease) value ΔTc2*e* of the second clutch 7 required to start the engine 2 by connecting the first clutch 6 from a released state.

Figure 8:
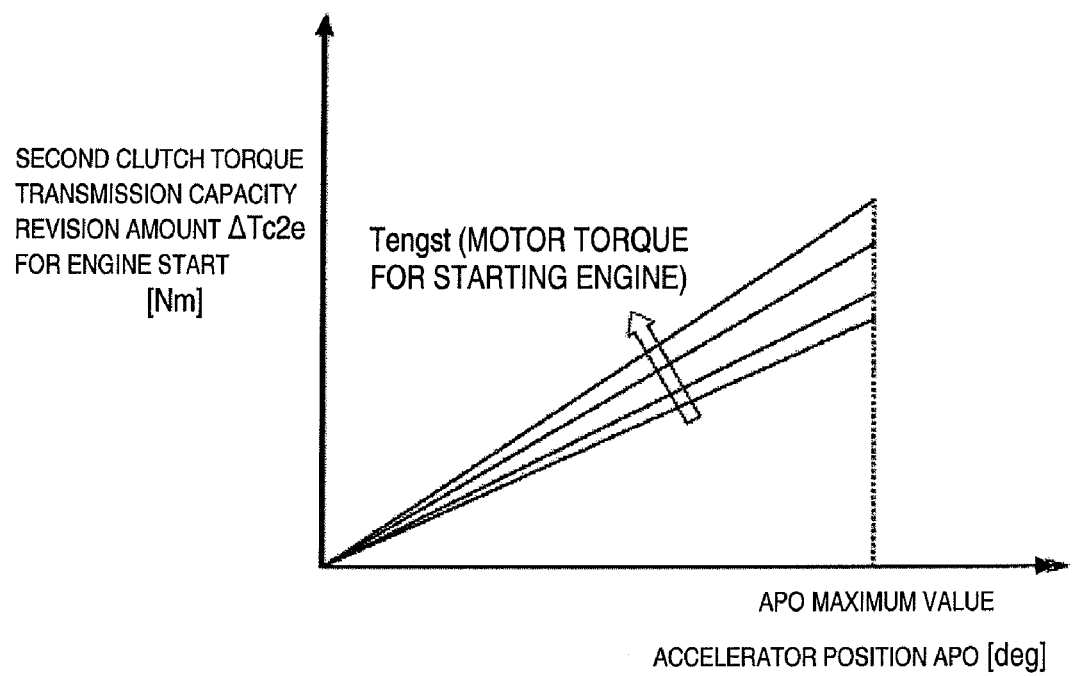
FIG. 8 is a second clutch torque transmission capacity characteristic map for determining a second clutch torque transmission capacity revision value for starting the engine.

More specifically, if the first clutch 6 is still not connected (Ne≠ Nc2*i*) even though the first clutch control mode flag fCL1 has been set to 1 in step S5 and it has been determined that the first clutch 6 should be connected, the general controller 20 finds the second clutch torque transmission capacity revision value ΔTc2*e* for starting the engine 2 as a function of the motor torque Tengst required to start the engine 2 and the accelerator pedal APO. For example, the general controller 20 finds the second clutch torque transmission capacity revision value ΔTc2*e* for starting the engine 2 by referring to a map like that shown in FIG. 8 using the motor torque Tengst required to start the engine 2 and the accelerator pedal APO.

Step S15 and step S16 of FIG. 3 correspond to the second clutch target torque transmission capacity value computing section 56 for second clutch rotation control shown in FIG. 7. In step S15, the general controller 20 adds the feed forward control second clutch target torque transmission capacity value tTc2*ff* and the second clutch torque transmission capacity revision value Tc2*fb* together and then subtracts the engine start second clutch torque transmission capacity revision value ΔTc2*e* from the sum to obtain a second clutch target torque transmission capacity value Tc2*fbon* for slip rotation control of the second clutch 7. In step S18, the general controller 20 sets the second clutch target torque transmission capacity value Tc2*fbon* for slip rotation control of the second clutch 7 as the second clutch slip control target torque transmission capacity value tTc2*slip*.

Meanwhile, if it determines in step S8 that slip control of the second clutch 7 should not be executed, the general controller 20 proceeds to step S16, where it initializes the second clutch target output rotational speed value tNc2*o* calculated in step S10 to the detected value of the second clutch output rotational speed Nc2*o* and initializes the integrator used to calculate the second clutch torque transmission capacity revision value Tc2*fb* calculated in step S13 to 0.

In step S17, in accordance with the determination made in step S8 that slip control of the second clutch 7 should not be executed, the general controller 20 calculates a second clutch target torque transmission capacity value tTc2*fboff* for normal control of the second clutch 7 in order to connect or disconnect the second clutch 7, hold the second clutch 7 steady in its current connected or disconnected state, or to serve as a target torque transmission capacity value to be used during a period prior to starting slip control of the second clutch 7 from a steady connected or steady disconnected state.

When the second clutch 7 is to be connected or held steady in a connected state, the second clutch target torque transmission capacity value tTc2*fboff* for normal control is set to the maximum value the second clutch 7 can attain. Meanwhile, when the second clutch 7 is to be released or held steady in a released state, the second clutch target torque transmission capacity value tTc2*fboff* for normal control is gradually decreased from the current torque transmission capacity of the second clutch 7.

The method of calculating the second clutch target torque transmission capacity value tTc2*fboff* for normal control of the second clutch 7 will now be explained for each case.

First, the method of calculating the second clutch target torque transmission capacity value tTc2*fboff* for the situation in which the second clutch is to be connected will be presented. In this situation, if the condition tTc2 (previous cycle) <tTd×Ksafe exists, then the general controller 20 calculates the second clutch target torque transmission capacity value tTc2*fboff* by the following equation:

$$Tc2fboff = tTc2(\text{previous cycle}) + \Delta Tc2(L/U).$$

In this situation, if the condition tTc2 (previous cycle) ≧tTd×Ksafe exists, then the general controller 20 calculates the second clutch target torque transmission capacity value tTc2*fboff* by the following equation:

$$tTc2fboff = tTd \times Ksafe.$$

In these equations, the term Ksafe represents a second clutch torque transmission capacity safety factor (>1), and the term ΔTc2(L/U) represents a rate of increase of torque transmission capacity during connection of second clutch Second, the method of calculating the second clutch target torque transmission capacity value tTc2*fboff* for the situation in which the second clutch is to be disconnected will be presented. In this situation, the general controller 20 set the second clutch target torque transmission capacity value $tTc2fboff=0$ unconditionally.

Third, the situation in which the second clutch will be shifted from connected state to slip control will be presented. In this situation, the general controller 20 set the second clutch target torque transmission capacity value $tTc2fboff=tTc2$ (previous cycle)$-\Delta Tc2(SLIP)$ unconditionally.

In these equation, the term $\Delta Tc2(SLIP)$ represents a rate of decrease of torque transmission capacity during shift to slip control of second clutch If the loop that proceeds from step S9 to S15 was selected, then in step S18 the general controller 20 sets the target torque transmission capacity value tTc2slip for slip control of the second clutch 7 to the value of the second clutch target torque transmission capacity value $tTc2fbon$ for slip rotation control of the second clutch 7 calculated in step S15 in accordance with the determination that slip control of the second clutch 7 should be executed. If the loop that passes through step S16 to S17 was selected, then in step S18 the general controller 20 sets the target torque transmission capacity value tTc2slip for slip control of the second clutch 7 to the value of the second clutch target torque transmission capacity value $tTc2fboff$ for normal control of the second clutch 7 calculated in step S17 in accordance with the determination that slip control of the second clutch 7 should not be executed.

Then, still in step S18, the general controller 20 sets the second clutch target torque transmission capacity value tTc2slip for slip control of the second clutch 7 determined as described above as the second clutch target torque transmission capacity value tTc2.

In step S20, the general controller 20 determines the target torque transmission capacity value tTc1 of the first clutch 6. More specifically, if the first clutch control mode flag fCL1 was set to 1 in step S5 (so as to connect the first clutch 6) and the actual slip rotational speed Nc2slip of the second clutch 7 is equal to or larger than the second clutch target slip rotational speed value (second clutch target slip rotational speed value for engine starting if engine is to be started), then the general controller 20 sets the first target clutch torque transmission capacity value tTc1 to the value of the maximum attainable torque transmission capacity Tc1max of the first clutch 6. Meanwhile, if the first clutch control mode flag fCL1 was set to 0 (so as to release the first clutch 6), then the general controller 20 sets the first target clutch torque transmission capacity value tTc1 to 0.

In step S21, the general controller 20 sets the hydraulic solenoid currents Ic2 and Ic1 of the second clutch 7 and the first clutch 6, respectively, that are required in order to achieve the second clutch target torque transmission capacity value tTc2 and first target clutch torque transmission capacity value tTc1 set as described above.

Figure 9:
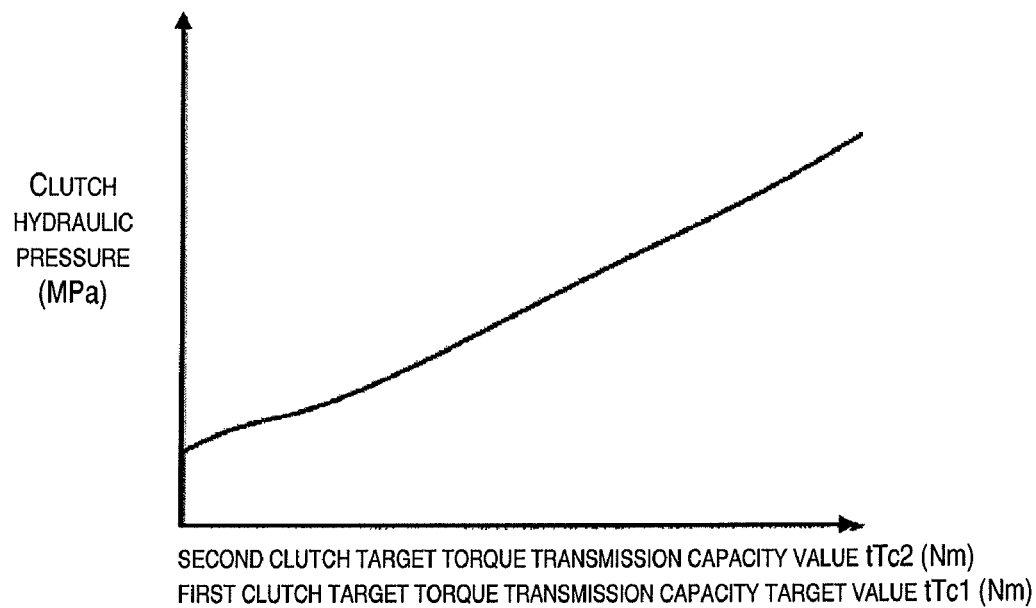
FIG. 9 is a clutch hydraulic pressure schedule map that is used to find a clutch hydraulic pressure corresponding to a target clutch torque transmission capacity value.
Figure 10:
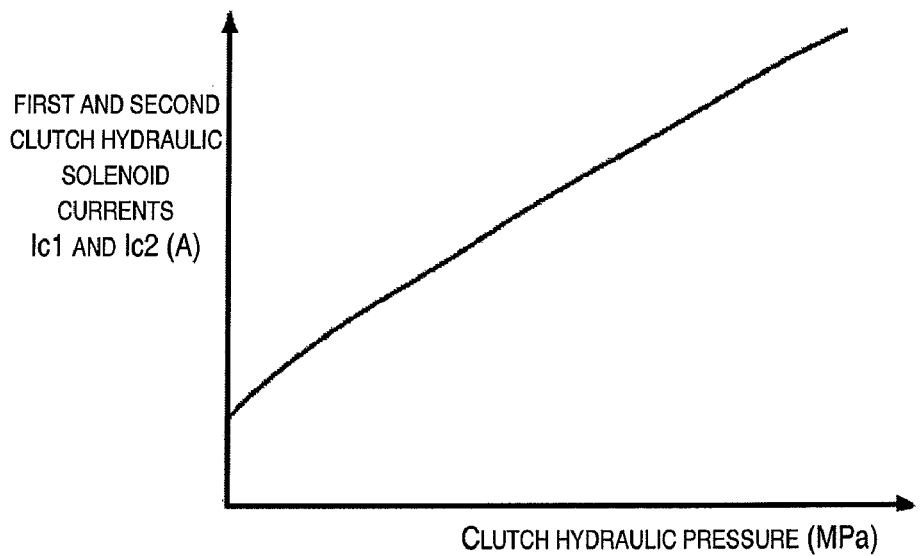
FIG. 10 is a hydraulic solenoid current schedule map used to find a hydraulic solenoid current required to generate the clutch hydraulic pressure found using FIG. 9.

More specifically, the general controller 20 uses a schedule map like that exemplified in FIG. 9 to determine the clutch hydraulic pressures required for the second clutch 7 and the first clutch 6 to achieve the second clutch target torque transmission capacity value tTc2 and the first target clutch torque transmission capacity value tTc1, respectively. Then, the general controller 20 uses a map like that exemplified in FIG. 10 to determine the hydraulic solenoid current Ic2 of the second clutch 7 and the hydraulic solenoid current Ic1 of the first clutch 6 necessary to generate the respective clutch hydraulic pressures.

In step S24, the hydraulic solenoid current Ic2 for the second clutch 7 and the hydraulic solenoid current Ic1 for the first clutch 6 will be sent to the clutch controller 26 and the clutch controller 26 will execute connection control of the second clutch 7 and the first clutch 6 such that the torque transmission capacities thereof become equal to the target values tTc2 and tTc1, respectively.

Step S22 corresponds to a one-way clutch target input/output relative rotational speed value computing section 35, a one-way clutch output rotational speed computing section 36, a one-way clutch target input rotational speed value computing section 37, a one-way clutch input rotational speed computing section 38, a subtractor 39, and a one-way clutch target input/output relative rotational speed control motor torque value computing section 40 shown in FIG. 2. In step S22, the general controller 20 sets a one-way clutch target input/output relative rotational speed value $t\Delta Nowc$ to be used during the period when the automatic transmission 4 is in a gear that transmits power through the one-way clutch. The target relative rotational speed value $t\Delta Nowc$ is set in accordance with the determination result of step S3 (drive/coast determining section 31 of FIG. 2), i.e., whether the hybrid vehicle is in a driven state with the accelerator pedal depressed (APO>0) or in a coasting state with the accelerator pedal released (APO=0). Then, the general controller 20 computes the target motor torque value tTmslip (one-way clutch input/output relative rotational speed control target motor torque value) that will be required in order to achieve the target value $t\Delta Nowc$ by executing rotational speed control of the motor/generator 1.

An explanation will now be provided regarding how the computation is accomplished by the one-way clutch target input/output relative rotational speed value computing section 35, the one-way clutch output rotational speed computing section 36, the one-way clutch target input rotational speed value computing section 37, the one-way clutch input rotational speed computing section 38, the subtractor 39, and the one-way clutch target input/output relative rotational speed control motor torque value computing section 40 shown in FIG. 2.

The one-way clutch target input/output relative rotational speed value computing section 35 sets the target value $t\Delta Nowc$ for the input/output relative rotational speed of the one-way clutch (i.e., the rotational speed obtained by subtracting the output side rotational speed from the input side rotational speed) to a small value, e.g., −50 rpm, while the vehicle is coasting. Even more preferable is to gradually adjust the target value $t\Delta Nowc$ to 0 at a prescribed rate of change per unit time that will not cause shock to occur when the one-way clutch engages for starting a re-acceleration operation.

The one-way clutch output rotational speed computing section 36 computes the one-way clutch output rotational speed Nowco based on rotational speed information related to a portion of the drive train on the output side of the one-way clutch, e.g., information from the vehicle speed sensor 12.

The one-way clutch target input rotational speed value computing section 37 calculates a one-way clutch target input rotational speed value tNowci based on the one-way clutch target input/output relative rotational speed value $t\Delta Nowc$ and the one-way clutch output rotational speed Nowco (e.g., $tNowci=Nowco+t\Delta Nowc$).

The one-way clutch input rotational speed computing section 38 computes the one-way clutch input rotational speed Nowci based on rotational speed information related to a portion of the drive train on the input side of the one-way clutch, e.g., information from second clutch output rotational speed sensor 14.

The subtractor 39 subtracts the one-way clutch input rotational speed Nowci from the one-way clutch target input rotational speed value tNowci in order to find the error Nowcerr of the one-way clutch input rotational speed Nowci with respect to the one-way clutch target input rotational speed value tNowci.

The one-way clutch target input/output relative rotational speed control motor torque value computing section 40 calculates the target motor torque value tTmslip (one-way clutch input/output relative rotational speed control target motor torque value) that the motor/generator 1 needs to output in order to bring the rotational speed error Nowcerr to 0 and make the one-way clutch input rotational speed Nowci equal to the one-way clutch target input rotational speed value tNowci. The target motor torque value tTmslip can be calculated, for example, using feedback (PID) control based on the rotational speed error Nowcerr.

Step S23 of FIG. 3 corresponds to the target motor torque value selecting section 41 shown in FIG. 2 and is contrived to select the target motor torque value tTm based on the determination result of step S3 (i.e., the drive/coast determining section 31). More specifically, if the hybrid vehicle is in a driven state with the accelerator pedal depressed (APO>0), then the general controller 20 sets the target motor torque value tTm to the target motor torque value tTmbase for driving force (torque) control calculated in step S7 (i.e., by the torque distributing section 33 of FIG. 2). Meanwhile, if the hybrid vehicle is in a coasting state with the accelerator pedal released (APO=0), then the general controller 20 sets the target motor torque value tTm to the target motor torque value tTmslip for one-way clutch input/output relative rotational speed control calculated in step S22 (i.e., by the one-way clutch target input/output relative rotational speed control motor torque value computing section 40 of FIG. 2).

In order to accommodate the shift from a coasting state to a driven state, step S23 of FIG. 3 (target motor torque value selecting section 41 of FIG. 2) is contrived to change the target motor torque value tTm from the target motor torque value tTmslip for one-way clutch input/output relative rotational speed control to the base target motor torque value tTmbase for driving force (torque) control. The method of handling this change will now be explained.

In a case in which the target input/output relative rotational speed value tΔNowc is set to a small value, e.g., −50 rpm, while the hybrid vehicle is coasting and gradually adjusted to 0 at a prescribed rate of change per unit time starting from when a re-acceleration operation is executed, as previously described, step S3 (the drive/coast determining section 31 of FIG. 2) is contrived to change the target motor torque value tTm from tTmslip to tTmbase when the target input/output relative rotational speed value tΔNowc becomes 0, which occurs after re-acceleration operation is performed, i.e., after the accelerator pedal is depressed.

Conversely, in a case in which the target input/output relative rotational speed value tΔNowc is not gradually adjusted from the coasting value of −50 rpm to 0 after a re-acceleration operation is performed, step S3 (the drive/coast determining section 31 of FIG. 2) is contrived to change the target motor torque value tTm from tTmslip to tTmbase when it is determined that a re-acceleration operation has been performed, i.e., that the accelerator pedal has been depressed.

In step S24, the general controller 20 sends the target motor torque value tTm (for the motor/generator 1) determined as just described to the motor/generator controller 25 and the motor/generator controller 25 controls the motor/generator 1 such that the output motor torque becomes equal to the target value tTm.

Figure 11:
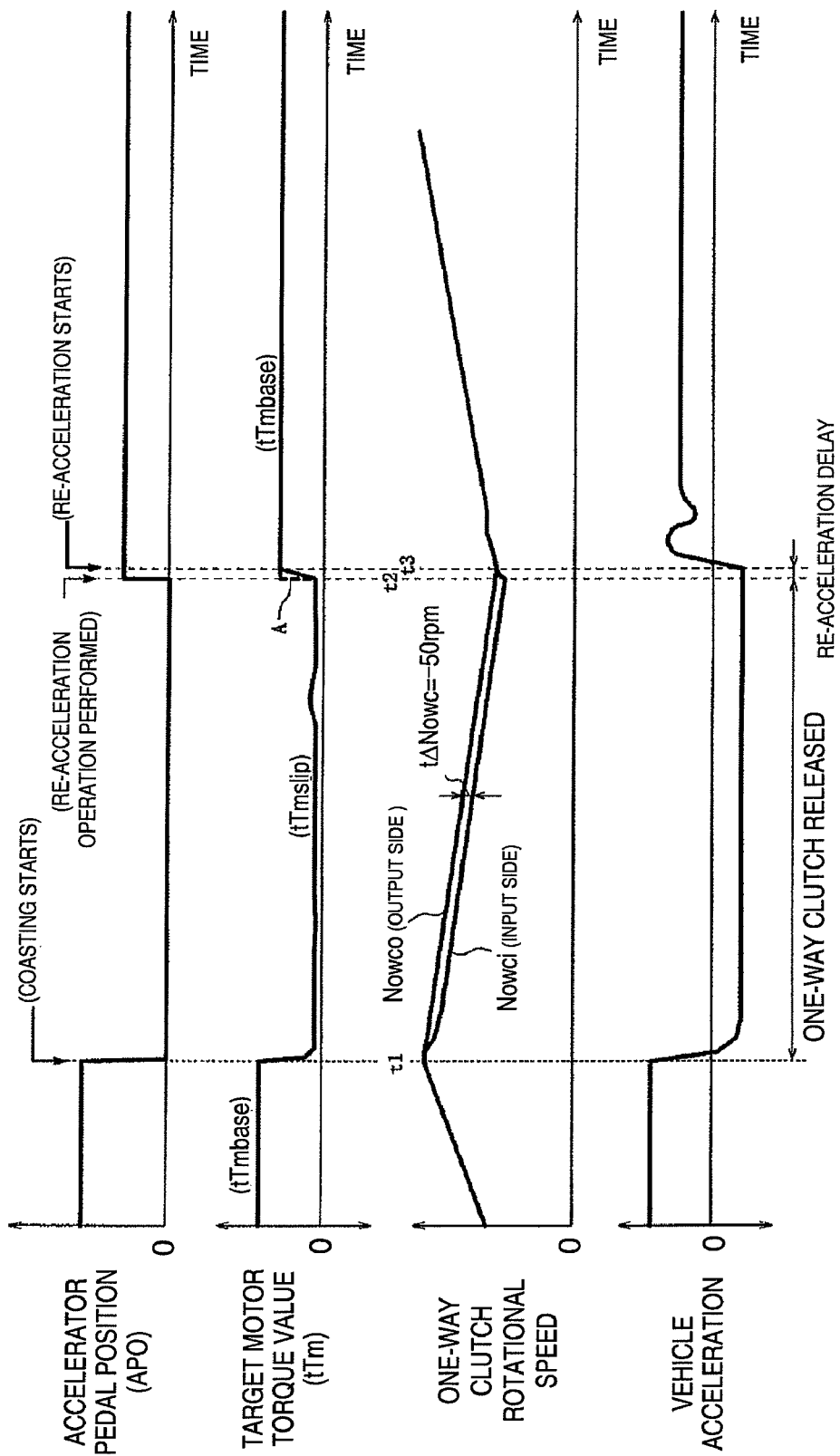
FIG. 11 is a time chart illustrating the operation of the hybrid vehicle control apparatus shown in FIGS. 1 to 3.

The operational effects of a control apparatus in accordance with the embodiment will now be explained with reference to FIG. 11. FIG. 11 is an operation time chart for a situation in which the automatic transmission 4 is in a torque transmitting path (gear) in which the power is transmitted from the automatic transmission 4 through the one-way clutch. Between the times t1 and t2, the accelerator pedal is released (accelerator position=0) and the vehicle is coasting and at the time t2, the accelerator pedal is depressed (re-acceleration operation) and the vehicle begins to accelerate again.

Although the previously proposed control apparatus sets the target motor/generator torque value tTm to 0 when the vehicle is coasting during the period from the time t1 when coasting starts to the time t2 when a re-acceleration operation is performed, in the embodiment the target motor/generator torque value tTm is controlled to the value tTmslip such that the input rotational speed Nowci of the one-way clutch approaches (increases toward) the output rotational speed Nowco of the one-way clutch and the relative rotational speed between the input and output sides of the one-way clutch becomes equal to the target value tΔNowc (=−50 rpm).

Therefore, the difference between the input rotational speed Nowci of the one-way clutch and the output rotational speed Nowco of the one-way clutch is reduced by the time t2 when the re-acceleration operation is performed.

Additionally, in the embodiment, immediately after the time t2 when the re-acceleration operation is performed, the target motor/generator torque value tTm (=tTmslip) is determined as indicated with the solid-line curve shown in FIG. 11 such that the one-way clutch target input/output relative rotational speed value tΔNowc is gradually changed from −50 rpm to 0 rpm. Thus, the input rotational speed Nowci of the one-way clutch approaches (increases) even closer to the output rotational speed Nowco such that at the time t3, the input rotational speed Nowci becomes equal to the output rotational speed Nowco.

As a result, at the time t3, the one-way clutch becomes engaged and driving force (torque) is transmitted from the motor/generator 1 to the wheels (i.e., re-acceleration begins).

After the time t3 when the one-way clutch becomes engaged (re-acceleration starts), the target motor/generator torque value tTm changes from the target value tTmslip for input/output relative rotational speed control of the one-way clutch to the target value tTmbase for driving force (torque) control and normal driving force (torque) control is executed.

With this embodiment, since the difference between the input rotational speed Nowci and the output rotational speed Nowco of the one-way clutch is reduced during the period between the times t1 and t2 when the vehicle is coasting, the difference between the input rotational speed Nowci and the output rotational speed Nowco of the one-way clutch is smaller than it would otherwise be at the time t2 when the re-acceleration operation is executed. As a result, the re-acceleration delay that exists between the time t2 when the re-acceleration operation is performed and the time t3 when re-acceleration actually starts is clearly shorter with the control executed in the embodiment shown in FIG. 11 than with the control executed in the comparative example shown in FIG. 13. Furthermore, the change in the vehicle acceleration occurring immediately after the time t3 when re-acceleration starts is smaller in the embodiment than in the comparative example shown in FIG. 13.

In the embodiment, after the time t2 when the re-acceleration operation is performed, the difference between the input rotational speed Nowci and the output rotational speed Nowco is gradually decreased toward 0 by executing rotational speed control in which the target motor/generator torque value tTm of the motor/generator 1 is set to tTmslip. As a result, the change in the vehicle acceleration occurring immediately after the time t3 when re-acceleration starts can be reduced even further, as indicated in FIG. 11.

If the difference between the input rotational speed Nowci and output rotational speed Nowco of the one-way clutch is sufficiently reduced at the time t2 when the re-acceleration operation is performed, then problem of engagement shock occurring when the one-way clutch engages may not exists and it may not be necessary to control to gradually reduce the rotational speed difference to 0 after the time t2. In such a case, the re-acceleration response can be improved and the engagement shock of the one-way clutch can be alleviated by changing the target motor/generator torque value tTm from the target value tTmslip for one-way clutch input/output relative rotational speed control to the base target value tTmbase for driving force (torque) control as indicated by the broken line A at the time t2. For contrast, the operation of a comparative example not employing the control executed by the embodiment will now be explained with reference to the time chart shown in FIG. 13.

Figure 13:
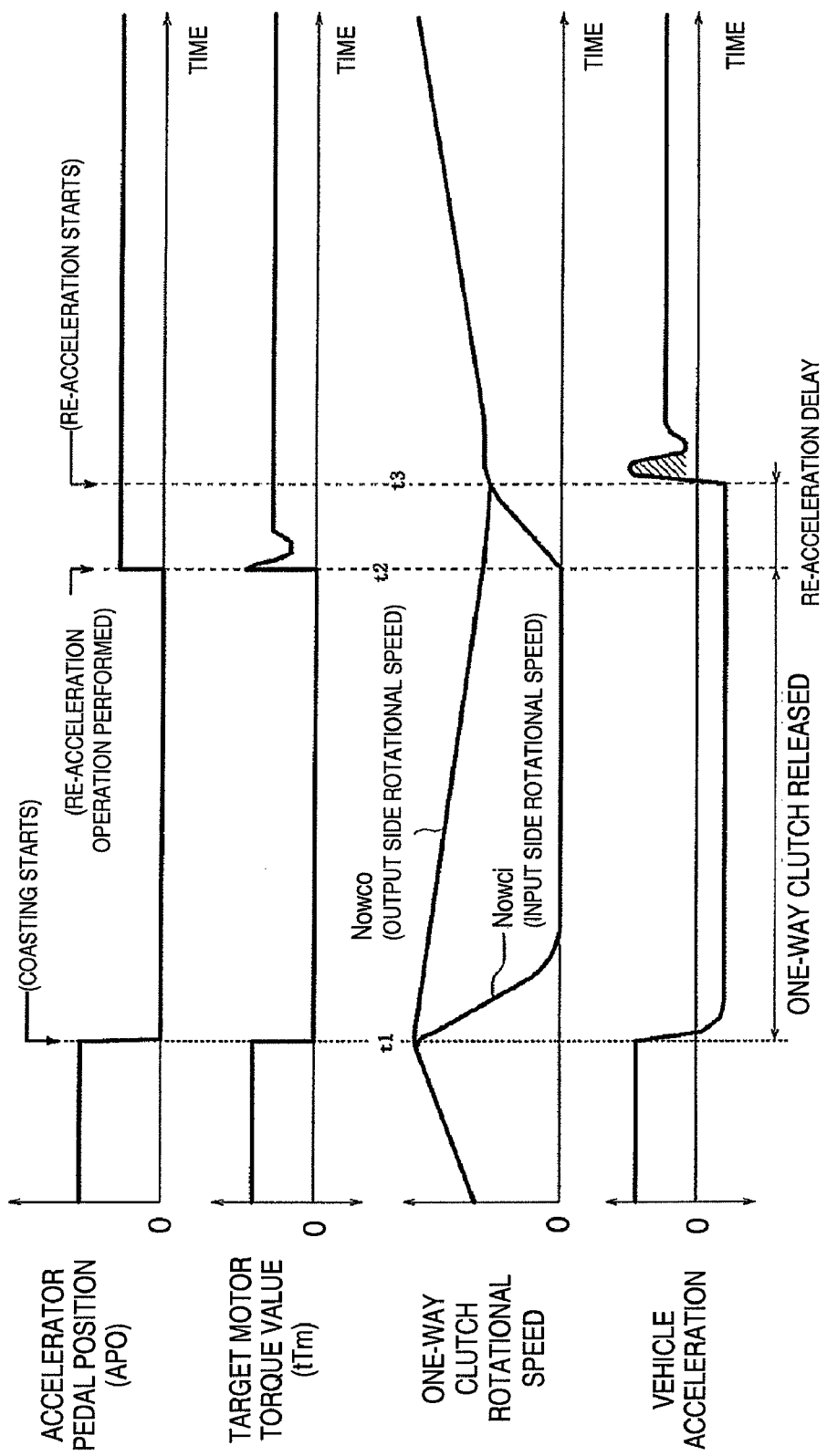
FIG. 13 is a time chart illustrating the operation of a hybrid vehicle control apparatus in accordance with a comparative example.

FIG. 13 is an operation time chart for a situation in which the transmission is in a torque transmitting path (gear) in which the power is transmitted from the transmission through the one-way clutch. Between the times t1 and t2, the accelerator pedal is released (accelerator position=0) and the vehicle is coasting and at the time t2, the accelerator pedal is depressed (re-acceleration operation) and the vehicle begins to accelerate again.

During the coasting that takes place between the time t1 when coasting starts and the time t2 when the re-acceleration operation is performed, the engine and the motor/generator (power sources) are stopped in order to improve the fuel efficiency. Consequently, the rotational speed Nowci of the input side of the one-way clutch goes to 0 and the one-way clutch enters a released state in which the difference between the input rotational speed Nowci and the output rotational speed Nowco of the one way clutch is large.

When the accelerator pedal is depressed (re-acceleration operation) at the time t2, re-acceleration commences and the motor/generator (or the motor/generator and engine) starts driving (target motor torque value tTm>0) such that the input rotational speed Nowci of the one-way clutch increases from 0. At a time t3, the input rotational speed Nowci reaches the output rotational speed Nowco and the one-way clutch enters an engaged state. Starting from the time t3, a drive force (drive torque) is transmitted from the motor/generator (or from the motor/generator and the engine) to the wheels.

Since the input rotational speed Nowci of the one-way clutch diverges greatly from the output rotational speed Nowco of the one-way clutch during coasting, the response delay, i.e., the amount of time between the time t2 when the re-acceleration operation is started and the time t3 when the input rotational speed Nowci and the output rotational speed Nowco become equal and the one-way clutch engages (vehicle acceleration begins), is large. Furthermore, a large clutch engagement shock occurs immediately after the one-way clutch becomes engaged and acceleration begins at the time t3. This shock is indicated clearly in FIG. 13 by the portion of the vehicle acceleration curve occurring immediately after the time t3 (indicated with shading under the curve).

Figure 12:
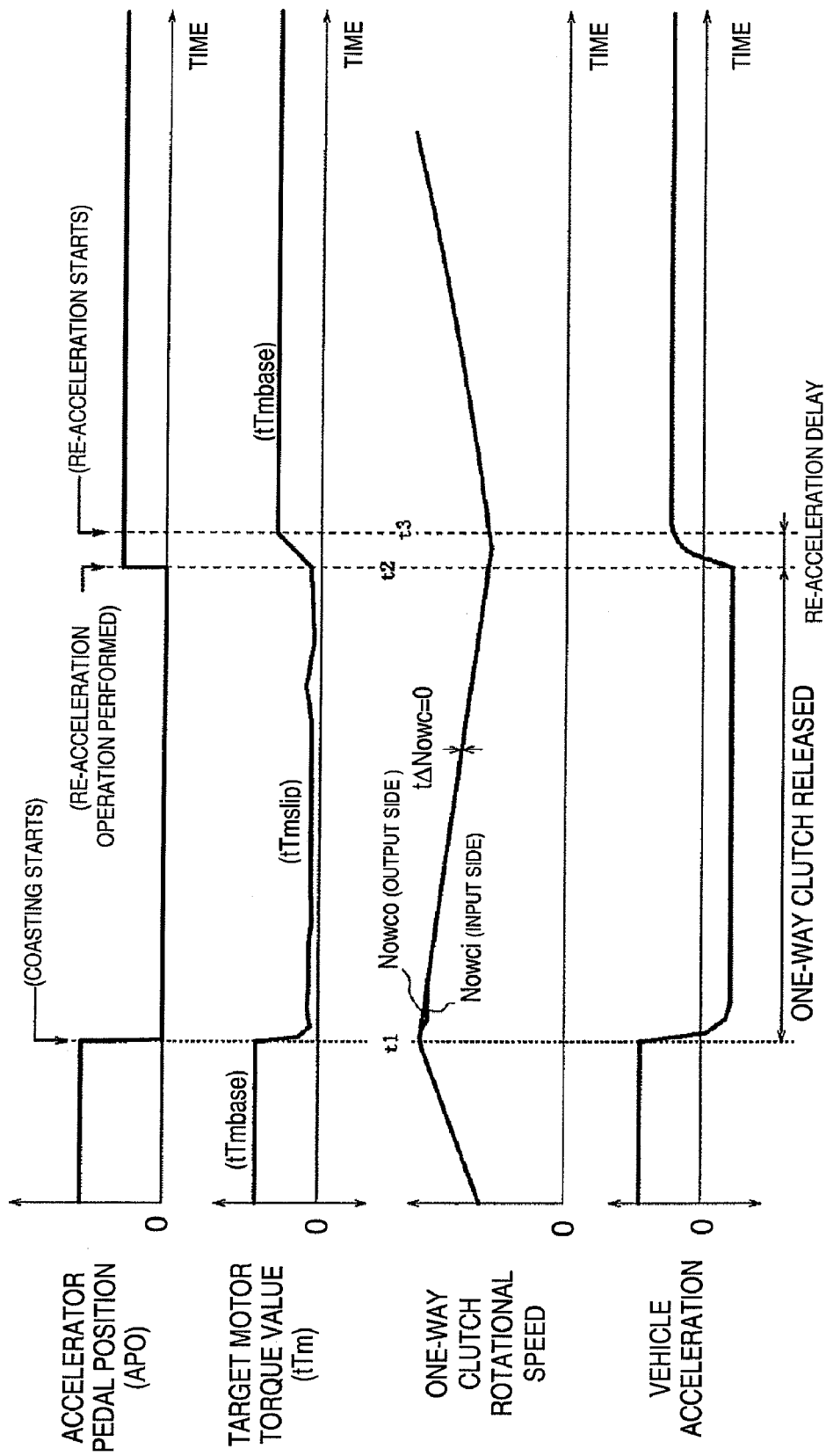
FIG. 12 is a time chart, similar to FIG. 11, illustrating the operation of a hybrid vehicle control apparatus in accordance with another embodiment of the present invention.

FIG. 12 is an operation time chart for a control apparatus in accordance with another embodiment of the present invention. In this embodiment, the manner in which the section 41 shown in FIG. 2 selects the target motor torque value tTm and the one-way clutch target input/output relative rotational speed value tΔNowc set by the one-way clutch target input/output relative rotational speed value computing section 35 are different than in the previous embodiment.

Also in this embodiment, when the vehicle is coasting during the period between the times t1 and t2, the target motor torque value selecting section 41 selects the target motor torque value tTmslip for one-way clutch input/output relative rotational speed control as the target motor torque value tTm.

However, in this embodiment, during the coasting period from the time t1 when coasting starts until the time t2 when the re-acceleration operation is performed, the target motor torque value tTmslip for one-way clutch input/output relative rotational speed control is set to a value that will cause the input rotational speed Nowci of the one-way clutch to become equal to the output rotational speed Nowco and the relative rotational speed between the input and output sides of the one-way clutch to become 0 (target value tΔNowc=0). At the same time, the target motor/generator torque value tTm is controlled to be equal to the value tTmslip.

When the re-acceleration operation time t2 is reached, the target motor torque value selecting section 41 selects the base target motor torque value tTmbase for driving force (torque) control as the target motor torque value tTm instead of the target motor torque value tTmslip for one-way clutch input/output relative rotational speed control.

The motor/generator controller 25 shown in FIG. 2 receives the command requesting this selection. When it changes the target motor torque value tTm from the target motor torque value tTmslip for one-way clutch input/output relative rotational speed control to the base target motor torque value tTmbase for driving force (torque) control, the motor/generator controller 25 changes the target motor torque value tTm from the target motor torque value tTmslip for one-way clutch input/output relative rotational speed control to the base target motor torque value tTmbase for driving force (torque) control in a gradual manner at a prescribed rate of change per unit time during the period from the time t2 to the time t3 (indicated as a time series change in FIG. 12) using a low pass filter. The low pass filter is expressed by a transfer function GLPF, written $GLPF(s)=1/\{\tau LPF+1\}$, where $\tau LPF$ is a time constant.

The rate of change with which the target motor torque value tTm changes from tTmslip to tTmbase is set to the largest possible value at which sudden changes in motor torque will not cause significant shock (i.e., shock large enough to be a problem) to occur. Thus, the goals of alleviating shock and reducing the re-acceleration delay can both be achieved.

With this control, the input rotational speed Nowci of the one-way clutch is already equal to the output rotational speed Nowco of the one-way clutch at the time t2 when the re-acceleration operation is performed and engagement shock of the one-way clutch resulting from the re-acceleration operation can be eliminated.

Since the target motor torque value tTm is changed gradually from tTmslip to tTmbase at a prescribed rate of change per unit time during the period from the time t2 (when the re-acceleration operation is performed) to the time t3, the change in the motor torque does not cause any significant shock to occur and the re-acceleration response delay between the time t2 and the time t3 is not large enough to be a problem, as is clear from the curve indicating the change in the vehicle acceleration during the period between the time t2 and the time t3 in FIG. 12.

The method of using a low pass filter to accomplish changing the target motor torque value tTm from the target motor torque value tTmslip for one-way clutch input/output relative rotational speed control to the base target motor torque value tTmbase for driving force (torque) control in a gradual manner at a prescribed rate of change per unit time can also be employed in the previous embodiment (which was explained previously with reference to FIG. 11).

In the previous embodiment, as explained previously with reference to FIG. 11, immediately after the time t2 when the re-acceleration operation is performed, the target motor/generator torque value tTm (=tTmslip) is determined as indicated with the solid-line curve shown in FIG. 11 such that the one-way clutch target input/output relative rotational speed value tΔNowc is gradually changed from −50 rpm to 0 rpm. Thus, the input rotational speed Nowci of the one-way clutch approaches (increases) even closer to the output rotational speed Nowco such that at the time t3, the input rotational speed Nowci becomes equal to the output rotational speed Nowco. After the time t3 when the one-way clutch engages (re-acceleration starts), the target motor/generator torque value tTm changes from the target value tTmslip for input/output relative rotational speed control of the one-way clutch to the target value tTmbase for driving force (torque) control and the apparatus shifts from one-way clutch input/output relative rotational speed control to normal driving force (torque) control.

In such a case, i.e., in the previous embodiment, a low pass filter can be used to prevent the occurrence of a large engagement shock at the time t3 when the input rotational speed Nowci of the one-way clutch becomes equal to the output rotation speed Nowco of the one-way clutch such that the one-clutch becomes engaged (re-acceleration starts). More specifically, a low pass filter can be used to change the target motor/generator torque value tTm from the target value tTmslip for one-way clutch input/output relative rotational speed control to the target value tTmbase for driving force (torque) control in a gradual manner at a prescribed rate of change per unit time such that the change in the motor torque does not cause engagement shock of the one-way clutch to occur.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hybrid vehicle control apparatus comprising:
an engine;
a transmission including at least one torque transmitting path that transmits power through a one-way clutch;
a motor/generator arranged between the engine and the transmission;
a first clutch with a variable torque transmission capacity being disposed between the engine and the motor/generator;
a second clutch with a variable torque transmission capacity being disposed in a power train that spans from the motor/generator to a drive wheel via the transmission; and
a controller configured to disengage the first clutch and engage the second clutch to select an electric drive mode in which the engine is stopped and the drive wheel is driven solely with power from the motor/generator, and to engage both the first and second clutches to select a hybrid drive mode in which the drive wheel is driven with power from both the engine and the motor/generator,
the controller being further configured to execute a rotational speed control of the motor/generator while in a coasting state with the transmission in the torque transmitting path that transmits power through the one-way clutch such that the rotational speed control increases a rotational speed of an input side of the one-way clutch to a value closer to a rotational speed of an output side of the one-way clutch with a difference between the rotational speeds of the input and output sides of the one-way clutch becoming equal to a target value.

2. The hybrid vehicle control apparatus of claim 1, wherein the controller is further configured to execute a subsequent rotational speed control of the motor/generator that is separate from a drive request imposed on the motor/generator from a re-acceleration operation, when the acceleration operation is performed from the coasting state, such that the subsequent rotational speed control increases the rotational speed of the input side of the one-way clutch closer to the rotational speed of the output side of the one-way clutch with the difference between the rotational speeds of the input and output sides of the one-way clutch becoming smaller than the target value.

3. The hybrid vehicle control apparatus of claim 2, wherein the controller is further configured to execute the subsequent rotational speed control of the motor/generator executed when the re-acceleration operation is performed such that the rotational speed of the input side of the one-way clutch is increased until the difference between the rotational speeds of the input and output sides of the one-way clutch becomes zero.

4. The hybrid vehicle control apparatus of claim 3, wherein the controller is further configured to switch from the subsequent rotational speed control of the motor/generator to a torque control of the motor/generator after the vehicle has undergone acceleration from the coasting state and the rotational speed control of the motor/generator has made the rotational speeds of the input and output sides of the one-way clutch equal.

5. The hybrid vehicle control apparatus of claim 4, wherein the controller is further configured to control the switch from the subsequent rotational speed control to the torque control of the motor/generator such that a target motor torque value of the motor/generator is changed gradually at a prescribed rate of change per unit time from a target value for the rotational speed control to a target value for the torque control.

6. The hybrid vehicle control apparatus of claim 1, wherein the controller is further configured to set the target value regarding the difference between the rotational speeds of the input and output sides of the one-way clutch to zero such that the rotational speed control of the motor/generator executed during the coasting state causes the rotational speeds of the input and output sides of the one-way clutch to be equal.

7. The hybrid vehicle control apparatus of claim 6, wherein the controller is further configured to switch from the rotational speed control of the motor/generator to a torque control of the motor/generator when an acceleration operation is performed from the coasting state.

8. The hybrid vehicle control apparatus of claim 7, wherein the controller is further configured to control the switch from the rotational speed control to the torque control of the motor/generator such that a target motor torque value of the motor/generator is changed gradually at a prescribed rate of change per unit time from a target value for the rotational speed control to a target value for the torque control.

9. A hybrid vehicle control apparatus comprising:
first drive force generating means for generating a first drive force;
power transmission means for establishing a torque transmitting path that transmits power through a one-way clutch;
second drive force generating means for generating a second drive force between the first drive force generating means and the power transmission means;
first variable torque transmission capacity clutch means for selectively engaging and disengaging the first and second drive force generating means;
second variable torque transmission capacity clutch means for selectively controlling torque in a power train that spans from the second drive force generating means to a drive wheel via the power transmission means; and
control means for disengaging the first variable torque transmission capacity clutch means and engaging the second variable torque transmission capacity clutch means to select an electric drive mode in which the first drive force generating means is stopped and the drive wheel is driven solely with power from the second drive force generating means, and for engaging both the first and second variable torque transmission capacity clutch means to select a hybrid drive mode in which the drive wheel is driven with power from both the first and second drive force generating means,
the control means further performing execution of a rotational speed control of the second drive force generating means while in a coasting state with the power transmission means in the torque transmitting path that transmits power through the one-way clutch such that the rotational speed control increases a rotational speed of an input side of the one-way clutch to a value closer to a rotational speed of an output side of the one-way clutch with a difference between the rotational speeds of the input and output sides of the one-way clutch becoming equal to a target value.

10. A hybrid vehicle control method comprising:
selectively generating a first drive force with an engine;
selectively controlling a transmission to establish a torque transmitting path that transmits power through a one-way clutch;
selectively generating a second drive force with a motor/generator arranged between the engine and the transmission; and
selectively controlling a first clutch with a variable torque transmission capacity being disposed between the engine and the motor/generator and a second clutch with a variable torque transmission capacity being disposed in a power train that spans from the motor/generator to a drive wheel via the transmission such that an electric drive mode is selected in which the engine is stopped and the drive wheel is driven solely with power from the motor/generator by disengaging the first clutch and engaging the second clutch, and a hybrid drive mode is selected in which the drive wheel is driven with power from both the engine and the motor/generator by engaging both the first and second clutches; and
performing a rotational speed control of the motor/generator while in a coasting state with the transmission in the torque transmitting path that transmits power through the one-way clutch such that the rotational speed control increases a rotational speed of an input side of the one-way clutch to a value closer to a rotational speed of an output side of the one-way clutch with a difference between the rotational speeds of the input and output sides of the one-way clutch becoming equal to a target value.

* * * * *